United States Patent [19]
Cowles

[11] Patent Number: 5,904,750
[45] Date of Patent: May 18, 1999

[54] VOC CONTROL/SOLVENT RECOVERY SYSTEM

[76] Inventor: Harold R. Cowles, 9355 North 91st St. #120, Scottsdale, Ariz. 85258

[21] Appl. No.: 08/932,271

[22] Filed: Sep. 17, 1997

Related U.S. Application Data

[63] Continuation-in-part of application No. 08/517,777, Aug. 22, 1995, Pat. No. 5,676,738.

[51] Int. Cl.⁶ .................................................. B01D 53/12
[52] U.S. Cl. ................................ 95/109; 95/111; 95/143; 96/123; 96/130; 96/144; 96/150
[58] Field of Search ..................... 95/107–111, 143–147; 96/108, 121–123, 126–132, 144, 150

[56] References Cited

U.S. PATENT DOCUMENTS

| | | | |
|---|---|---|---|
| 2,397,566 | 4/1946 | Schutte | 96/123 |
| 2,590,322 | 3/1952 | Imhoff et al. | 96/126 X |
| 2,664,967 | 1/1954 | Molstedt | 96/131 X |
| 3,023,836 | 3/1962 | Kasbohm et al. | 96/126 X |
| 4,046,530 | 9/1977 | Izumo et al. | 96/123 X |
| 4,047,906 | 9/1977 | Murakami et al. | 96/131 X |
| 4,061,477 | 12/1977 | Murakami et al. | 55/79 |
| 4,147,523 | 4/1979 | Izumo | 96/126 |
| 4,149,023 | 4/1979 | Mizuno et al. | 96/126 |
| 4,207,082 | 6/1980 | Okamoto et al. | 55/60 |
| 4,259,094 | 3/1981 | Nagai et al. | 96/123 |
| 4,859,216 | 8/1989 | Fritsch | 96/126 X |
| 4,869,734 | 9/1989 | Jacquish | 96/144 X |
| 4,902,311 | 2/1990 | Dingfors et al. | 96/150 X |
| 5,176,798 | 1/1993 | Rodden | 96/122 X |
| 5,304,234 | 4/1994 | Takatsuka et al. | 96/123 X |
| 5,383,955 | 1/1995 | Neal et al. | 96/123 X |
| 5,389,125 | 2/1995 | Thayer et al. | 96/122 X |
| 5,496,395 | 3/1996 | Yamazaki | 96/123 |

FOREIGN PATENT DOCUMENTS

| | | | |
|---|---|---|---|
| 52-002867 | 1/1977 | Japan | 96/127 |
| 58-173323 | 10/1983 | Japan | 96/127 |

Primary Examiner—Robert Spitzer
Attorney, Agent, or Firm—Cahill, Sutton & Thomas P.L.C.

[57] ABSTRACT

A new synthetic, pyrolized, spherical adsorbent, with a moving or fluidized bed VOC control/solvent recovery system, also described as a control/solvent recovery system.

13 Claims, 5 Drawing Sheets

VOC CONTROL/SOLVENT RECOVERY SYSTEM

CROSS REFERENCES TO CO-PENDING APPLICATIONS

This patent application is a continuation-in-part (CIP) of Ser. No. 08/517,777 entitled "VOC Control/Solvent Recovery System" filed on Aug. 22, 1995, now U.S. Pat. No. 5,676,738.

BACKGROUND OF THE INVENTION

1. Field of the Invention

The present invention is for solvent vapor control, solvent recovery, and air pollution control.

2. Description of the Prior Art

Kureha Chemical Industries of Tokyo, Japan, has had patents on moving bed solvent recovery systems. These patents have now expired. These patents were based on a beaded form of a natural carbon source, petroleum pitch. The distinction with the current invention is the use of higher performing, synthetic ion exchange resin, a new product.

Chemateur of Sweden has moving bed systems based on another type of non-pyrolized synthetic resin. This material has a more limited applicability and suffers from physical attrition.

SUMMARY OF THE INVENTION

The general purpose of the present invention is for volatile organic compound (VOC) control.

According to one embodiment of the present invention, there is provided a fluid bed system, including a continuous solvent adsorption section, a continuous desorption section, and a condensation section for use in conjunction with a newly developed synthetic pyrolized carbonaceous adsorbent or other adsorbent media.

One significant aspect and feature of the present invention is continuous solvent vapor control through fluid bed or moving bed adsorption.

Another significant aspect and feature of the present invention is the use of a new pyrolized, synthetic, spherical adsorbent pellets to achieve practical fluid bed operation.

Yet another significant aspect and feature of the present invention is the option of having a pre-concentrator prior to oxidation.

Still another significant aspect and feature of the present invention is the use of fluid bed adsorption, with fluid bed desorption as a pre-concentration device.

A further significant aspect and feature of the present invention is the use of the basic fluid bed adsorber and moving bed desorber as a concentrator device, followed by in situ or ex situ VOC destruction using ozone and ultraviolet light, known as UV-ozonation.

A further significant aspect and feature of the present invention is the blending of the synthetic pyrolized carbon adsorbent pellets with other adsorption media, such as silica gel or polymeric adsorber or carbon pellets.

Another significant aspect and feature of the present invention is adsorbent regeneration for beaded pyrolytic material or other adsorbent media.

A further significant aspect and feature of the present invention is the use of microwave or radio frequency (RF) as methods of providing regeneration energy. These energy sources are applicable to all embodiments of the invention.

These heating methods apply to the synthetic pyrolized carbonaceous adsorbent medium alone or in combination with polymeric adsorbents or standard carbon pellets.

Yet another significant aspect and feature of the present invention is using a second fluid bed section for desorption, in place of the primary embodiment which uses a packed bed desorber. In this case, a typical embodiment would include an oxidizer for final destruction.

Yet another significant aspect and feature of the present invention is the use of ozone by itself, ultraviolet light by itself, or the combined use of ozone and ultraviolet light to destroy concentrated gaseous desorbate solvent in situ in synthetic pyrolized adsorbent pellets or other adsorbent media.

Yet another significant aspect and feature of the present invention is the use of plasma to destroy desorbed and concentrated VOC'S.

Having thus described significant aspects and features of the present invention, it is the principal object of the present invention to provide a VOC control/solvent recovery system.

One object of the present invention is to recover solvent from contaminated air.

Another object of the present invention is to concentrate solvent vapor from contaminated air and then to destroy the concentrated desorbate.

Typical applications of the various forms of the invention include, but are not limited to, industrial air decontamination of all types, soil remediation projects, water remediation projects, any other processes or conditions for which control of airborne solvent is required.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
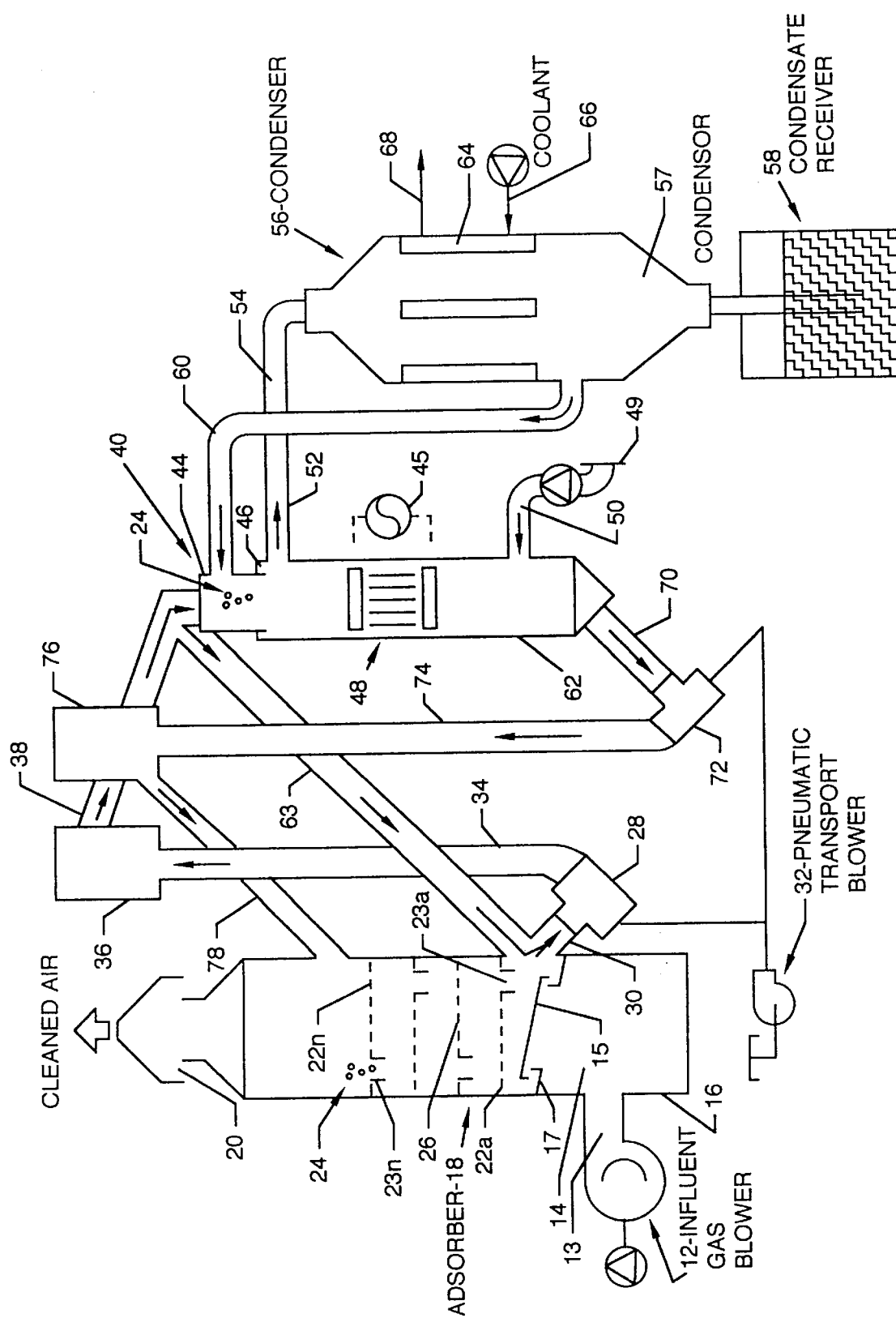
FIG. 1 illustrates a basic system with fluid bed adsorber, moving bed desorber, and condenser.

FIG. 1 illustrates the overall novel concept incorporating the use of a new spherical, pyrolized, synthetic carbonaceous adsorbent in a fluidized bed or moving bed volatile organic compound (VOC) control and/or recovery system. The type of adsorbent is exemplified by, but not limited to, adsorbents such as Rohm and Haas "Ambersorb 563". In particular, "Ambersorb 600" is one suitable form of the product for this application.

The general concept is described in FIG. 1, which incorporates a fluid bed adsorber to collect the solvent vapors (VOC's), transfer pipes, a moving bed desorber to regenerate the adsorbent, and a condenser to recover the concentrated VOC's from the desorbate stream. This configuration provides continuous VOC control and recovery.

A process gas blower 12, soil vapor extraction blower, air stripping tower blower, or other such contaminated air source blower, conveys contaminated air 13 having contaminated process gas vapors 14 at a constant rate into the lower region 16 of the moving bed adsorber 18 known also as a multi-stage fluid bed adsorber or simply as an adsorber. The adsorber 18 generally is a vessel having one or more input and/or output ports and an upper vent 20 which allows cleansed air to exit the interior of the adsorber 18.

The contaminated air 13 flows upward through an inlet gas covered vent 15 located on a gravity feed slanted bottom plate 17 in the lower region 16 and through a plurality of horizontally aligned sieve trays 22a–22n. The inlet gas covered vent may be of a tubular design with a cap, single or multiple in number, or elongated slots with covers, single or multiple in number. There can be from 1 to 20 sieve trays, for purposes of example and illustration, in the adsorber 18, depending upon the characteristics of the process gas being treated. The adsorber sieve tray openings can be round, with diameters in the range of 0.5 to 10.0 mm, and having center-to-center distances of 0.6 to 20 mm. Any combination of hole sizes and spacing listed are suitable for the invention. The sieve tray openings can also be slotted, with slot widths of 0.5 to 10.0 mm. Slot lengths can be 0.5 to 500 mm, with spacing between slots of 0.5 to 10.0 mm. Any combination of slot sizes, lengths, and spacing is applicable to the invention. The tray shell section can be of a single structural enclosure design, or modular in construction, such that sieve trays can be added or removed as necessary. The adsorbers can be configured singly, or in groups of two or more, depending on the case addressed. A fresh supply of synthetic, pyrolized adsorbent in the form of pellets 24, alone or in combination with polymeric adsorbent and/or similar forms of carbon and/or silica gel and/or other stand alone adsorbent media, is provided and is evenly distributed on all the sieve trays 22a–22n. Contaminated air passing upwardly through the sieve trays 22a–22n suspends the adsorbent pellets 24 in a moving or fluidized bed 26. The contaminated air intimately contacts all adsorbent pellets 24, simultaneously creating the fluid bed and providing for removal of the solvent vapors in the contaminated air. The sieve trays 22a–22n each has passageways 23a–23n which allow downward passage of the adsorbent pellets 24 successively from the upper sieve tray 22n to lower sieve trays, thus creating structure which allows the adsorbent pellets 24 to be suspended and flow across the upper surface of each sieve tray 22n–22a and downwardly to each successive sieve tray layer through the passageways 23a–23n in a fashion and manner described herein as a moving or fluidized bed 26. The sieve trays 22a–22n are designed to provide proper air flow and adsorbent pellet distribution such that efficient solvent vapor collection takes place in the adsorber 18. In any embodiment of the invention, the adsorber or adsorbers can be operated at sub-fluidization air velocity to create a moving bed, a feature that is also part of the invention.

As the contaminated air 13 passes through each sieve tray 22a–22n, VOC's (volatile organic compounds) are collected on the downward moving synthetic adsorbent pellets 24. After passing through the final sieve tray 22n of the adsorber 18, the cleansed air exits the top of the adsorber 18 through the vent 20.

Spent adsorbent pellets 24, which have traveled completely across each sieve trays 22n–22a, collect on the gravity feed slanted bottom plate 17 in the adsorber lower region 16. The spent adsorbent pellets 24 flow from the gravity feed slanted bottom plate 17 downwardly into pipe section 28 through interceding drain pipe 30.

A pneumatic transport blower 32 connected to the bottom of pipe section 28 creates a steady flow of air in transfer pipe 34. As spent adsorbent pellets 24, also referred to as beaded carbonaceous adsorbent (BCA), drain or flow into the pipe section 28 through drain pipe 30 from the moving bed adsorber 18, they are entrained in the air stream created by pneumatic transport blower 32, and thus pneumatically conveyed upwardly to be deposited in a chamber 36 at the upper end of the transfer pipe 34.

A transfer pipe 38, assisted by gravity and forced air from the pneumatic transport blower 32, delivers volatile organic compound-laden adsorbent pellets 24 to a moving bed desorber 40. The moving bed desorber 40 components include an upper chamber 44, a heat exchanger 46, a heat transfer device 48, a lower chamber 62, and various inputs and outputs plumbed to components of the moving bed desorber 40. The adsorbent pellets 24 flow downwardly through transfer pipe 38 into the upper chamber 44 at the upper end of the heat exchanger 46. The majority of the adsorbent pellets 24 are received into the heat exchanger 46 and are heated in the heat exchanger 46 to release the concentrated solvent vapors collected in the moving bed adsorber 18. If an oversupply of adsorbent pellets 24 is supplied to the upper chamber 44 by transfer pipe 38, the excess adsorbent pellets 24 are carried by transfer pipe 63 to the lower region 16 of the moving bed adsorber 18 to be once again conveyed upwardly through transfer pipe 34 to chamber 36 and thence to the upper chamber 44 for processing. The heat exchanger 46 can be of various designs, including, but not limited to, tube and shell, fin tube, plate heaters, and electric heating elements of various designs. The heat source 45 for heat exchanger 46 can be steam, liquid hot oil, hot oil vapor, electrical heating elements, flue gas, or microwave energy, connected to a heat transfer device 48 about the heat exchanger 46.

As the adsorbent pellets 24 are heated and solvent vapors are desorbed, a small flow of carrier gas 49 is introduced to the lower chamber 62 of the heat exchanger 46 through pipe 50. The carrier gas 49 flows upwardly through the downwardly proceeding bed of adsorbent pellets 24 in the heat exchanger 46, thus removing the concentrated, desorbed solvent vapors which are purged from the adsorbent pellets 24 by the heat of the heat exchanger 46 to exit the desorption heat exchanger 46 through desorbate pipe 52.

The carrier gas 49 source can be air, nitrogen, inert gas of any type, flue gas, or other gaseous materials. In the case of flue gas, the flue gas can be controlled for low oxygen content, and can be temperature controlled by heat exchanger or water injection.

Desorbate pipe 52 conveys a stream of concentrated gaseous desorbate solvent 54 into a condenser 56. Liquified recovered solvent 57 drains into a condensate receiver 58. The carrier gas stream 49 flows from the condenser 56 by way of carrier gas return pipe 60 attached to the lower region of the condenser 56. Carrier gas return pipe 60 conveys the carrier gas 49 back to the chamber 44 at the top of the moving bed desorber 40. Optionally, the carrier gas 49 can be recycled or vented. A coolant coil 64, having a coolant input 66 and coolant output 68, aligns in the condenser 56.

Regenerated synthetic pyrolized adsorbent pellets 24 flow downward out of heat exchanger 46 and into the lower chamber 62 of the moving bed desorber 40. As an option, an adsorbent cooler section can be incorporated into the desorber lower chamber.

Regenerated adsorbent pellets 24 flow out of the moving bed desorber 40 lower chamber 62 and into a pipe section 72 by way of adsorbent drain pipe 70. Pneumatic transport blower 32 creates a steady flow of air flowing into pipe section 72 and adsorbent transfer pipe 74. As regenerated adsorbent pellets 24 flow out of adsorbent drain pipe 70, they are entrained in the airstream of adsorbent transfer pipe 74. The adsorbent pellets 24, also referred to as beaded carbonaceous adsorbent (BCA), are pneumatically transferred to a chamber 76 at the upper end of adsorbent transfer pipe 74 and to adsorber 18 via transfer pipe 78 to be placed on the top sieve tray 22n to once again perform the task of cleansing upwardly passing contaminated air. The synthetic adsorbent pellets 24 are thus recycled for collection of solvent vapors on a continuous basis.

FIRST ALTERNATIVE EMBODIMENT

Figure 2:
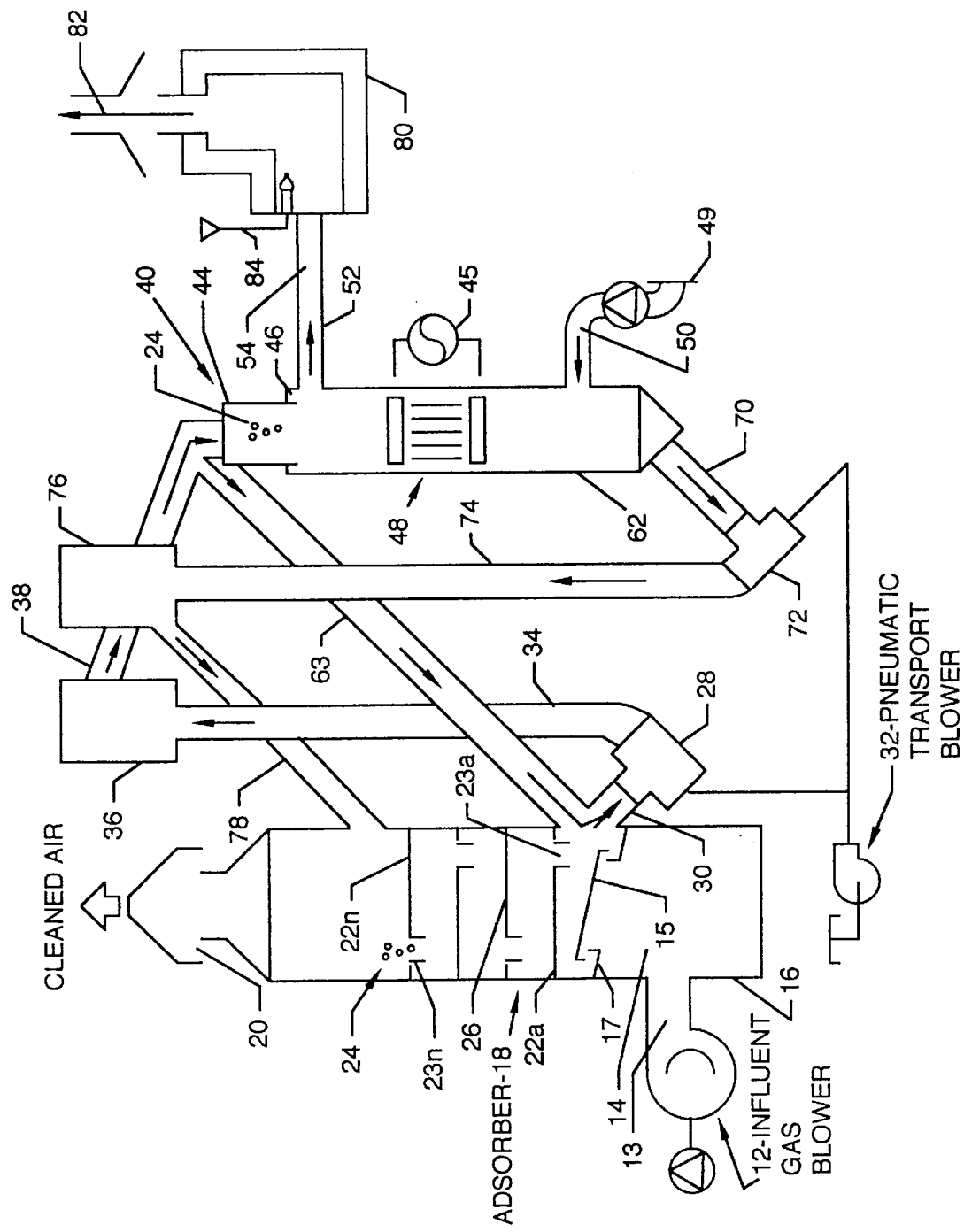
FIG. 2 illustrates a variation of FIG. 1 in which an oxidizer is used instead of a condenser (desorbate is destroyed rather than being recovered)

FIG. 2, a first alternative embodiment, illustrates the use of the fluid bed adsorber 18, the moving bed desorber 40, and transfer pipes 34 and 74 and associated components in conjunction with a small oxidizer 80 which replaces the condenser 56 previously described in FIG. 1. The highly concentrated gaseous desorbate solvent stream in desorbate pipe 52 is directed from the moving bed desorber 40 to the small oxidizer 80, in which the solvents (VOC's) are destroyed. The heat from the oxidized solvents is used as an energy source for desorption.

Desorbate pipe 52 carries the concentrated gaseous desorbate solvent stream to an oxidizer 80. The concentrated gaseous desorbate solvent 54 is economically destroyed in the oxidizer 80. The purified air exits the oxidizer 80 as flue gas 82. Supplemental fuel 84 can be added to the oxidizer 80 if the concentrated gaseous desorbate solvent heat values cannot sustain the oxidizer temperature at appropriate levels.

An option of this design is to use the hot flue gas 82 to provide energy for desorption. This can be achieved through direct use of the flue gas, with the temperature being regulated by a gas-to-gas heat exchanger and/or water mist injection (not illustrated). In addition, the flue gas can be blended with air at variable ratios to provide proper temperature control. In either case, the oxygen content of the flue gas 82 can be regulated by appropriate control of combustion air in the oxidizer 80.

Alternatively, the flue gas can be used to produce steam or to heat water, heat transfer oil, or to produce hot oil vapor. Any of these can be then used as an energy source for desorption.

These energy sources can be used to heat or supplement the heat exchanger 46 and/or the carrier gas 49.

SECOND ALTERNATIVE EMBODIMENT

Figure 3:
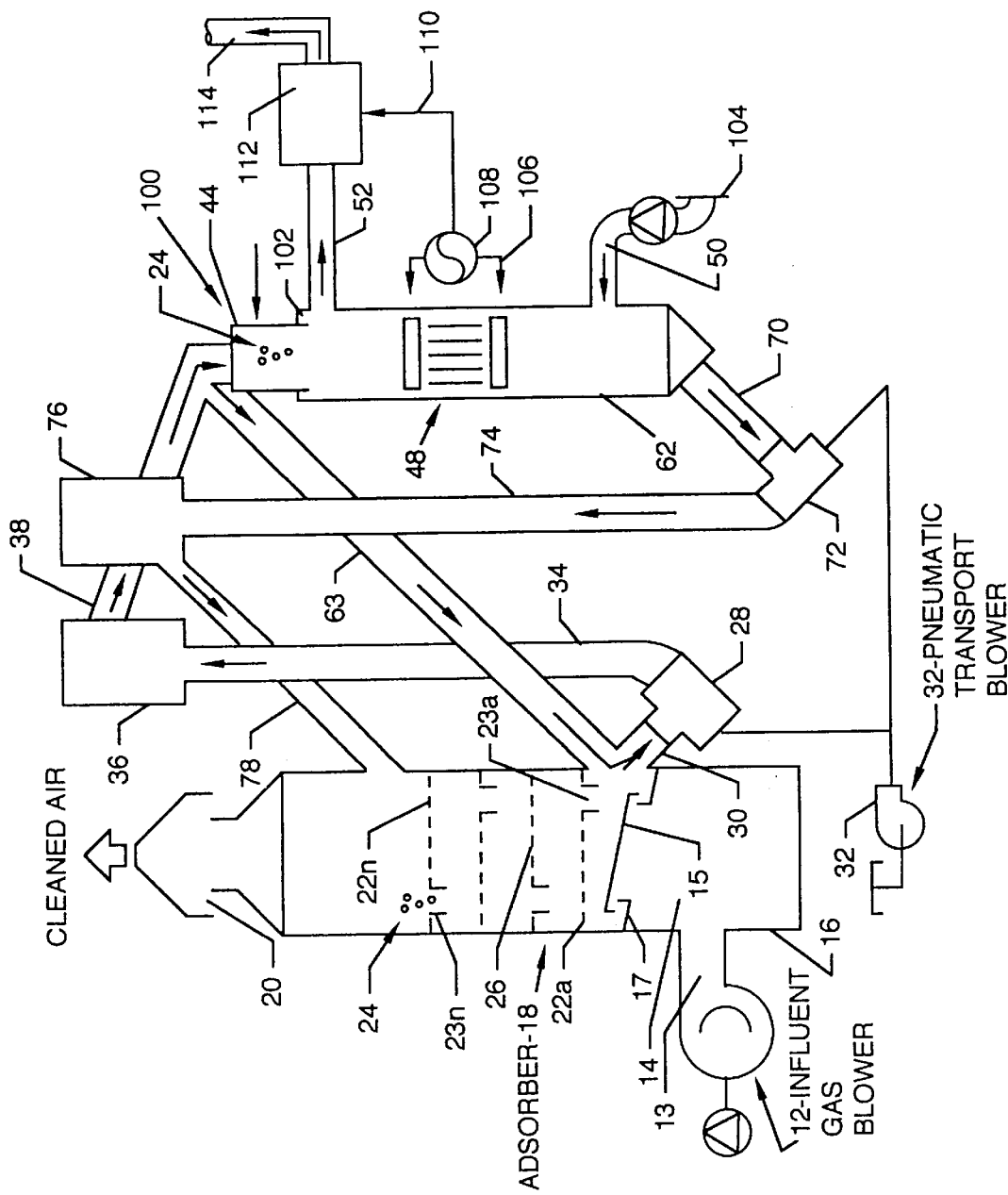
FIG. 3 illustrates a variation of FIG. 1 in which the desorbate is destroyed using ultraviolet light and ozone (UV-ozonation), or ozone or ultraviolet light alone.

FIG. 3, a second alternative embodiment, illustrates the fluid bed adsorber 18, the basic structure of the moving bed desorber 40 which is now designated and defined as a moving bed reaction desorber vessel 100, and the transfer pipes 34 and 74 and associated components in conjunction with the introduction of ozone alone, the introduction of ultraviolet light alone, or a combination introduction of ozone with ultraviolet light, to destroy the concentrated gaseous desorbate solvent in the synthetic pyrolized adsorbent pellets 24 within the reaction desorber vessel 100. The reaction desorber vessel 100 includes a large canister 102 in lieu of the heat exchanger 46; and heat transfer device 48 may or may not be used in this embodiment, depending upon the application.

In the moving bed reaction desorber vessel 100, the adsorbent pellets 24 flow downwardly through the large canister 102 as a packed bed. The flow of adsorbent pellets 24 in moving bed reaction desorber vessel 100 can be either pulsed or continuous, depending upon specific process requirements.

A controlled flow of ozone 104 can be introduced into the bottom of the moving bed reaction desorber vessel 100 by way of pipe 50 to destroy the concentrated gaseous desorbate solvent in situ in the synthetic pyrolized adsorbent pellets 24 or ultraviolet light 106 can be introduced to the moving bed reaction desorber vessel 100 by an ultraviolet light source 108 to destroy the concentrated gaseous desorbate solvent in situ in the synthetic pyrolized adsorbent pellets 24. Also, a combination of ultraviolet light 106 and ozone 104 can be introduced into the moving bed reaction desorber vessel 100 to destroy the concentrated gaseous desorbate solvent in situ in the synthetic pyrolized adsorbent pellets 24.

The gaseous reaction products, unreacted ozone, and any traces of unreacted solvent leave reaction desorber vessel 100 by way of desorbate pipe 52. As a final refinement step, a final reaction section 112 is included. The ultraviolet light source 108 can be used to provide ultraviolet energy 110 for the final reaction section 112 ozonation of unreacted materials or ozone can be introduced into the final reaction section 112 for an additional final refinement step. Additionally, both ultraviolet energy can be introduced in combination to the final reaction section 112 for an additional refinement step.

The gaseous products from the reaction sections are vented by way of vent pipe 114. Alternatively, unreacted ozone can be vented back to the adsorber lower region along with incoming process gas.

As an alternative, the concentrated gaseous desorbate solvent can be desorbed in a heat exchanger, as previously described, and then the concentrated gaseous desorbate solvent stream can be introduced to an ultraviolet/ozone reaction vessel for ex situ destruction of the concentrated gaseous desorbate solvent.

THIRD ALTERNATIVE EMBODIMENT

Figure 4:
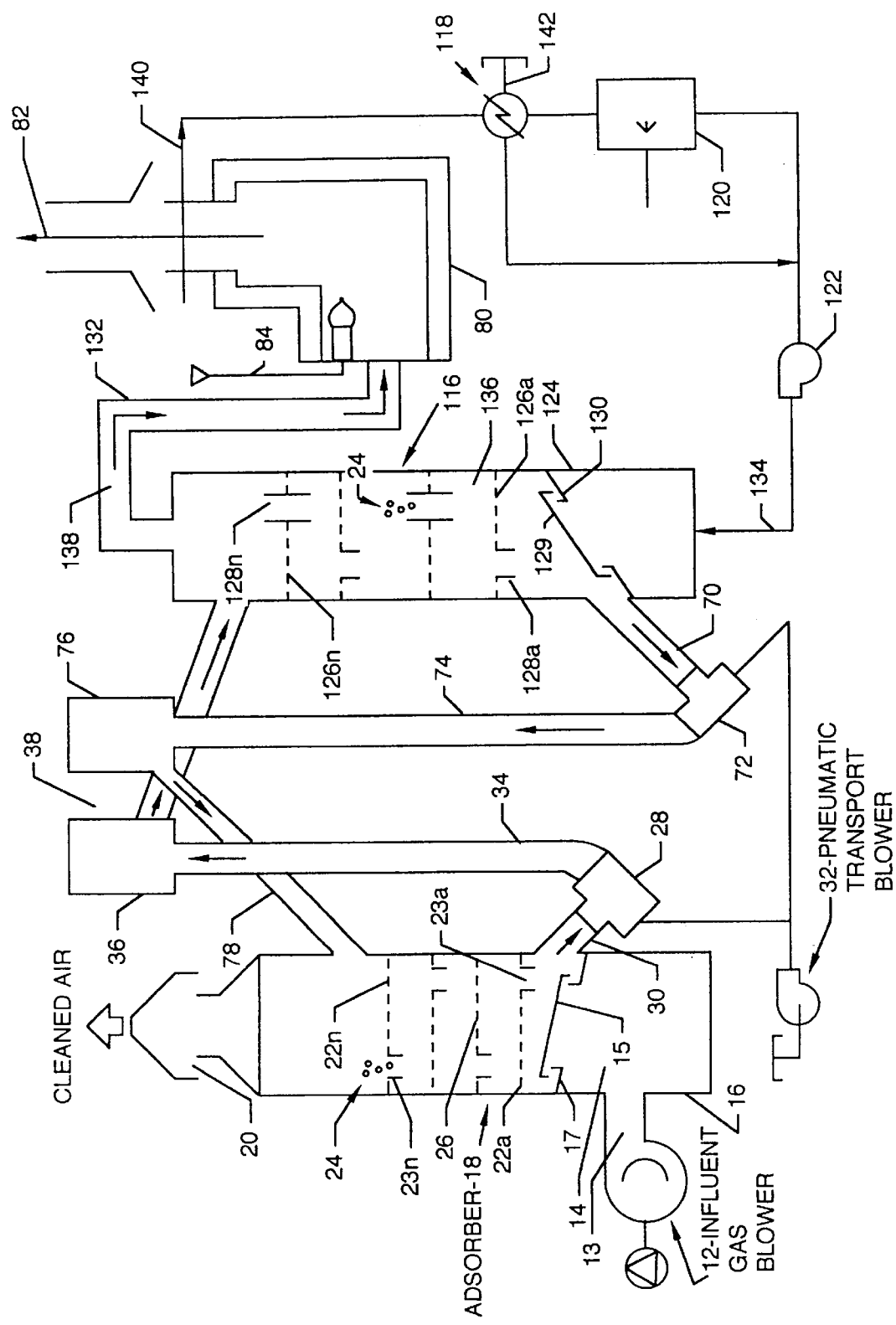
FIG. 4 illustrates a variation in which the moving bed desorber is replaced by a fluid bed desorber, followed by an oxidizer; and, FIG. 5 illustrates a variation of FIG. 2 in which desorbate is destroyed using plasma.

FIG. 4, a third alternative embodiment, illustrates the use of a fluid bed adsorber 18 and transfer pipes 34 and 74 and associated components previously described in FIG. 1, and a small oxidizer 80 which replaces the condenser 56 previously illustrated in FIG. 1, each in conjunction with a fluid bed desorber 116 which replaces the moving bed desorber 40 previously described in FIG. 1. A heat exchanger 118, a water injector 120, and an air lift blower 122 are also included. The fluid bed desorber 116 is similar in design to the fluid bed adsorber 18, but is smaller in design than the fluid bed adsorber 18. However, the adsorbent pellets 24 in the adsorber 18 collect contaminated process gas vapors 14 from the contaminated process air/gas stream 13, and in the fluid bed desorber, conditioned hot stripping gas 134 removes concentrated gaseous desorbate solvent from the adsorbent pellets 24. The size ratio of the fluid bed adsorber 18 to the fluid bed desorber 116 determines the concentration ratio of the desorbed VOC stream.

The fluid bed desorber 116 includes a lower region 124, sieve trays 126a–126n, passageways 128a–128n through sieve trays 126a–126n, respectively, a covered vent 129, a gravity feed slanted bottom plate 130, and a desorbate pipe 132 connected to the top of the fluid bed desorber 116 and the oxidizer 80. The tray design, hole or slot dimensions, and hole or slot spacing, and all combinations thereof, for the fluid bed desorber 116 are the same as previously described for the adsorber 18.

The cross sectional area of the fluid bed desorber 116 is designed to be some fraction of the moving bed adsorber 18. Fluid bed desorber 116 gas flow is therefore a fraction of the flow of contaminated gas particles inputted to adsorber 18. This provides a mechanism to reduce the gas for final treatment, and increase the gaseous desorbate solvent concentration correspondingly, as compared to the full process stream being treated.

Conditioned hot stripping gas 134 tempered by any one of or a combination of two or more of the oxidizer 80, the heat exchanger 118 or the water injector 120 is introduced to the fluid bed desorber lower region 124. This conditioned hot stripping gas 134 flows upward through the sieve trays 126a–126n. The pyrolized synthetic adsorbent pellets 24 containing concentrated gaseous desorbate solvent are distributed evenly on the sieve trays 126a–126n. The upward flow of hot stripping gas 134 suspends the adsorbent pellets 24 in a fluidized bed 136.

As the hot stripping gas 134 passes upwardly through the adsorbent pellets 24 in the fluidized bed 136, concentrated gaseous desorbate solvent is stripped from the adsorbent pellets 24. This concentrated gaseous desorbate solvent 138 is carried out of the fluid bed desorber 116 by way of desorbate pipe 132. The concentrated gaseous desorbate solvent 138 is piped to oxidizer 80. In the oxidizer 80, the concentrated gaseous desorbate solvent 138 is destroyed. Supplemental fuel 84 can be added, if the heat value of the concentrated gaseous desorbate solvent 138 cannot maintain sufficient oxidizer temperature. As an added feature, the oxygen content of flue gas 82 can be controlled by modulating the combustion air source of oxidizer 80.

The heat produced in oxidizer 80 is used to provide energy for fluid bed desorber 116. Flue gas 82 is the heat transfer source. Flue gas energy 140 extracted from the flue gas 82 can be utilized and/or controlled by any of the following means, as stand alone options, or in any combination of options collectively:

Flue gas 82 can be used directly as hot stripping gas 134. To do so, the temperature must be controlled using one or more of the options shown.

(1) Heat exchanger 118 can be used. This can be a gas-to-gas heat exchanger. It can also be a liquid cooled heat exchanger, with recovery of thermal energy for other uses, including heating of carrier gas.

(2) Water injector 120 can be used to control or condition the temperature of the hot stripping gas 134 and to insert the hot stripping gas 134.

(3) As an option, ambient air 142 can be heated using flue gas energy 140. This can be done through heat exchanger 118, the heat exchanger 118 options functioning as described above, directly or indirectly.

(4) As another option, ambient air 142 can be blended with flue gas energy 140 directly. The temperature of the hot stripping gas 134 is controlled by the blending ratio.

(5) Any combination of the above can be utilized to provide hot stripping gas 134 at an acceptable temperature, and level of oxygen, as specific applications mandate.

FOURTH ALTERNATIVE EMBODIMENT

Figure 5:
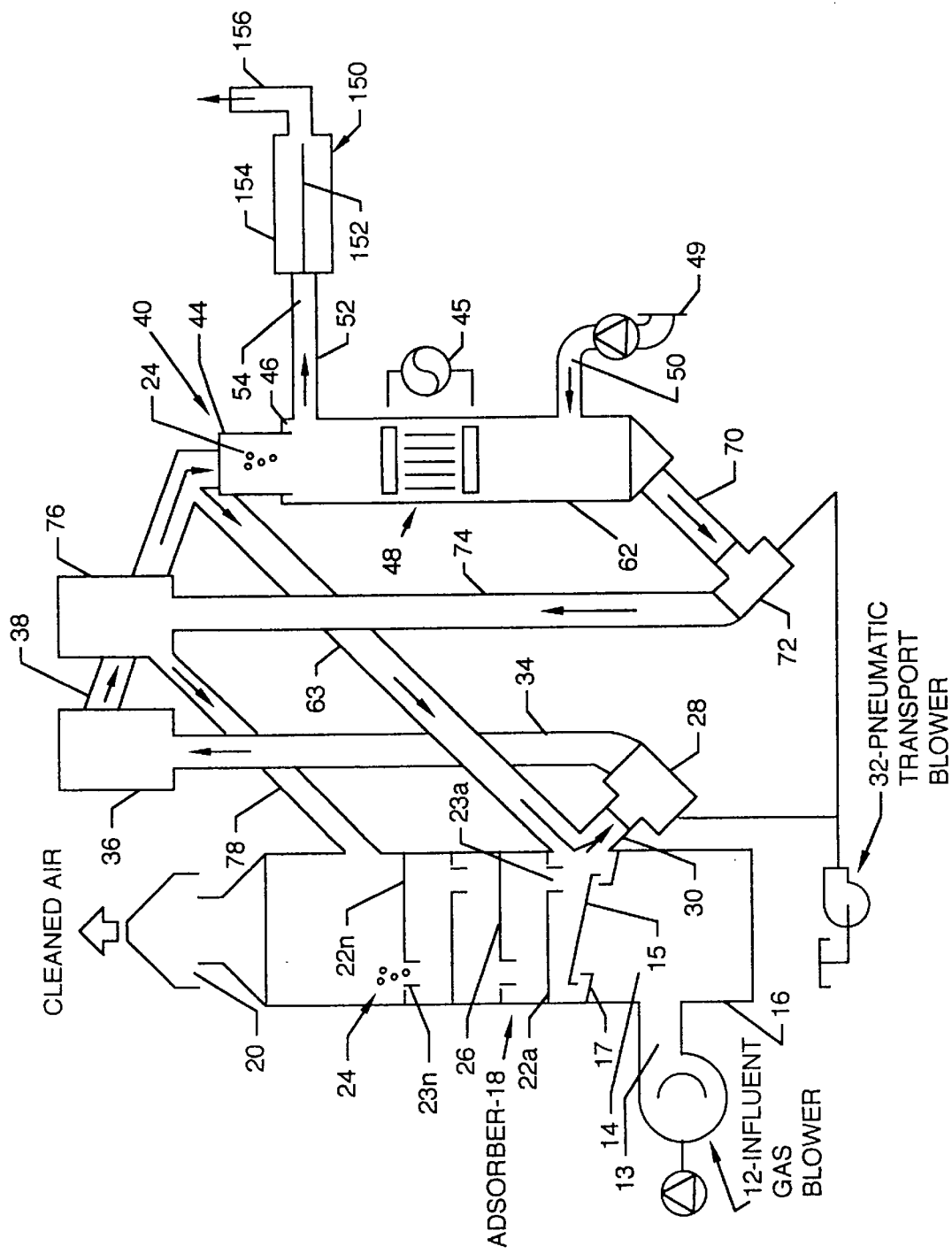

FIG. 5, a fourth alternative embodiment, illustrates the use of the fluid bed adsorber 18, the moving bed desorber 40, and transfer pipes 34 and 74 and associated components in conjunction with a plasma unit 150 which replaces the oxidizer 80 previously described in FIG. 2. It is understood that the fluid bed desorber shown in FIG. 4 could be used in conjunction with a plasma unit which would replace the oxidizer 80 described in FIG. 4. The plasma unit could also be used in conjunction with the system shown in FIG. 3 with the plasma unit replacing the final reaction section 112. For brevity, a description of the system as shown in FIG. 5 only will be presented. The highly concentrated gaseous desorbate solvent stream in desorbate pipe 52 is directed from the moving bed desorber 40 to the plasma unit 150, in which the solvents (VOC's) are destroyed.

Desorbate pipe 52 carries the concentrated gaseous desorbate solvent stream to a plasma unit 150. The plasma unit 150 includes an inner rod type electrode 152 and a surrounding outer electrode 154 used for plasma generation. The concentrated gaseous desorbate solvent 54 is economically destroyed in the plasma unit 150. The purified air exits the plasma unit 150 through a vent pipe 156 as $CO_2$ and $H_2O$.

Various modifications can be made to the present invention without departing from the apparent scope hereof.

I claim:

1. A process for controlling volatile organic compounds in a gaseous stream, the process comprising the steps of:

a. providing an adsorber vessel, having a gas inlet port and a gas exit vent, defining therebetween a generally upward directed gas flow path through the adsorber vessel, and a pellet input port and a pellet output drain port, defining therebetween a generally downward directed pellet flow path, said pellet flow path arranged generally counter to the generally upward directed gas flow path;

b. providing a desorber, having a pellet inlet and a pellet discharge, defining a generally downward pellet path therebetween and a carrier gas inlet and a carrier gas outlet, defining therebetween a generally upward directed carrier gas flow path, said carrier gas flow path arranged generally counter to the downward directed pellet path;

c. providing a first pellet transfer supplying the pellet inlet of the adsorber from the pellet outlet pipe of the moving bed desorber;

d. providing a second pellet transfer supplying the pellet inlet pipe of the desorber from the pellet outlet pipe of the adsorber;

e. providing spherical, pyrolized, synthetic adsorbent pellets;

f. directing the gaseous stream bearing the volatile organic compounds to be controlled into the gas inlet port;

g. adsorbing the volatile organic compounds in the gaseous stream to the pellets;

h. transferring the pellets to the desorber to place the volatile organic compounds in a carrier gas stream; and, i. eliminating the volatile organic compounds from the carrier gas stream by directing said stream between the electrodes of a plasma unit having electrodes for forming a plasma therebetween.

2. A process for controlling volatile organic compounds in a gaseous stream, the process comprising the steps of:

a. providing an adsorber vessel, having a gas inlet port and a gas exit vent, defining therebetween a generally upward directed gas flow path through the adsorber vessel, and a pellet input port and a pellet output drain port, defining therebetween a generally downward directed pellet flow path, said pellet flow path arranged generally counter to the generally upward directed gas flow path;

b. providing a desorber, having a pellet inlet and a pellet discharge, defining a generally downward pellet path therebetween and a carrier gas inlet and a carrier gas outlet, defining therebetween a generally upward directed carrier gas flow path, said carrier gas flow path arranged generally counter to the downward directed pellet path;

c. providing a first pellet transfer supplying the pellet inlet of the adsorber from the pellet outlet pipe of the moving bed desorber;

d. providing a second pellet transfer supplying the pellet inlet pipe of the desorber from the pellet outlet pipe of the adsorber;

e. providing spherical, pyrolized, synthetic adsorbent pellets;

f. directing the gaseous stream bearing the volatile organic compounds to be controlled into the gas inlet port;

g. adsorbing the volatile organic compounds in the gaseous stream to the pellets;

h. transferring the pellets to the desorber to place the volatile organic compounds in a carrier gas stream; and, i. eliminating the volatile organic compounds from the carrier gas stream by destruction by exposure to ultraviolet light.

3. The process of claim 2, wherein the destruction by UV occurs within the desorber.

4. A process for controlling volatile organic compounds in a gaseous stream, the process comprising the steps of:

a. providing an adsorber vessel, having a gas inlet port and a gas exit vent, defining therebetween a generally upward directed gas flow path through the adsorber vessel, and a pellet input port and a pellet output drain port, defining therebetween a generally downward directed pellet flow path, said pellet flow path arranged generally counter to the generally upward directed gas flow path;

b. providing a desorber, having a pellet inlet and a pellet discharge, defining a generally downward pellet path therebetween and a carrier gas inlet and a carrier gas outlet, defining therebetween a generally upward directed carrier gas flow path, said carrier gas flow path arranged generally counter to the downward directed pellet path;

c. providing a first pellet transfer supplying the pellet inlet of the adsorber from the pellet outlet pipe of the moving bed desorber;

d. providing a second pellet transfer supplying the pellet inlet pipe of the desorber from the pellet outlet pipe of the adsorber;

e. providing spherical, pyrolized, synthetic adsorbent pellets;

f. directing the gaseous stream bearing the volatile organic compounds to be controlled into the gas inlet port;

g. adsorbing the volatile organic compounds in the gaseous stream to the pellets;

h. transferring the pellets to the desorber to place the volatile organic compounds in a carrier gas stream; and i. eliminating the volatile organic compounds from the carrier gas stream by destruction by exposure to ultraviolet light within the desorber and by directing said stream between the electrodes of a plasma unit having electrodes for forming a plasma therebetween.

5. A volatile organic compound control comprising:

a. an adsorber vessel (18), having a contaminated process gas inlet port (13) and a scrubbed gas exit vent (20), defining therebetween a generally upward directed gas flow path through the adsorber vessel (18), and a pellet input port (78) and a pellet output drain port (30), defining therebetween a generally downward directed pellet flow path, said pellet flow path arranged generally counter to the generally upward directed gas flow path;

b. a moving bed desorber (40), having a pellet inlet (38) and a pellet discharge (70), defining a generally downward pellet path therebetween and a carrier gas inlet (50) and a carrier gas outlet (52), defining therebetween a generally upward directed carrier gas flow path, said carrier gas flow path arranged generally counter to the downward directed pellet path;

c. a plasma unit connected to the carrier gas outlet for elimination of volatile organic compounds;

d. first pellet transfer means supplying the pellet inlet (78) of the adsorber (20) from the pellet outlet pipe (70) of the moving bed desorber (40);

e. second pellet transfer means supplying the pellet inlet pipe of the desorber (40) from the pellet outlet pipe of the adsorber (20); and, f. pellets of synthetic pyrolized adsorbent in the pellet paths.

6. The volatile organic compound control of claim 5, wherein said plasma unit includes an inner rod electrode and a surrounding outer electrode used for plasma generation.

7. The volatile organic compound control of claim 6, wherein said volatile organic compounds are destroyed in said plasma unit and converted to $CO_2$ and $H_2O$ for exhaust.

8. A volatile organic compound control, comprising:

a. an adsorber vessel, having a contaminated process gas inlet port and a scrubbed gas exit vent, defining therebetween a generally upward directed gas flow path through the adsorber vessel, and a pellet input port and a pellet output drain port, defining therebetween a generally downward directed pellet flow path, said pellet flow path arranged generally counter to the generally upward directed gas flow path;

b. a moving bed desorber vessel, having a pellet inlet and a pellet discharge, defining a generally downward pellet path therebetween and a carrier gas inlet and a carrier gas outlet, defining therebetween a generally upward directed carrier gas flow path, said carrier gas flow path arranged generally counter to the downward directed pellet path, and a UV light source arranged to impinge on the pellet and carrier gas paths;

c. an ozone supply connected to the carrier gas inlet;

d. first pellet transfer means supplying the pellet inlet of the adsorber from the pellet outlet pipe of the moving bed desorber;

e. second pellet transfer means supplying the pellet inlet pipe of the desorber from the pellet outlet pipe of the adsorber; and, f. a plasma unit connected to the carrier gas outlet for elimination of volatile organic compounds.

9. The volatile organic compound control of claim 8, wherein said plasma unit includes an inner rod electrode and a surrounding outer electrode used for plasma generation.

10. The volatile organic compound control of claim 9, wherein said volatile organic compounds are destroyed in said plasma unit and converted to $CO_2$ and $H_2O$ for exhaust.

11. A volatile organic compound control, comprising:
   a. an adsorber vessel, having a contaminated process gas inlet port and a scrubbed gas exit vent, defining therebetween a generally upward directed gas flow path through the adsorber vessel, and a pellet input port and a pellet output drain port, defining therebetween a generally downward directed pellet flow path, said pellet flow path arranged generally counter to the generally upward directed gas flow path;
   b. a fluid bed desorber, having a pellet inlet and a pellet discharge, defining a generally downward pellet path therebetween and a stripper gas inlet and a stripper gas outlet, defining therebetween a generally upward directed stripper gas flow path, said stripper gas flow path arranged generally counter to the downward directed pellet path, the fluid bed desorber having a cross-sectional area less than the cross-sectional area of the fluid bed adsorber;
   c. a plasma unit connected to the carrier gas outlet for elimination of volatile organic compounds;
   d. first pellet transfer means supplying the pellet inlet of the adsorber from the pellet outlet pipe of the moving bed desorber;
   e. second pellet transfer means supplying the pellet inlet pipe of the desorber from the pellet outlet pipe of the adsorber; and,
   f. pellets of pyrolized synthetic adsorbent in the pellet paths.

12. The volatile organic compound control of claim 11, wherein said plasma unit includes an inner rod electrode and a surrounding outer electrode used for plasma generation.

13. The volatile organic compound control of claim 12, wherein said volatile organic compounds are destroyed in said plasma unit and converted to $CO_2$ and $H_2O$ for exhaust.

* * * * *